(12) United States Patent
Pelliccione et al.

(10) Patent No.: US 12,044,632 B2
(45) Date of Patent: Jul. 23, 2024

(54) AIRFOIL TIP CLEANING AND ASSESSMENT SYSTEMS AND METHODS

(71) Applicant: RAYTHEON TECHNOLOGIES CORPORATION, Farmington, CT (US)

(72) Inventors: Christopher James Pelliccione, Tolland, CT (US); Iuliana Cernatescu, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 118 days.

(21) Appl. No.: 17/744,523

(22) Filed: May 13, 2022

(65) Prior Publication Data

US 2023/0366835 A1 Nov. 16, 2023

(51) Int. Cl.
| | |
|---|---|
| *G01N 23/046* | (2018.01) |
| *F01D 21/00* | (2006.01) |
| *G01B 15/08* | (2006.01) |
| *G01N 23/06* | (2018.01) |
| *G08B 21/18* | (2006.01) |

(52) U.S. Cl.
CPC ......... *G01N 23/046* (2013.01); *F01D 21/003* (2013.01); *G01B 15/08* (2013.01); *G01N 23/06* (2013.01); *G08B 21/182* (2013.01); *F05D 2260/83* (2013.01); *G01N 2223/04* (2013.01); *G01N 2223/419* (2013.01)

(58) Field of Classification Search
None
See application file for complete search history.

(56) References Cited

U.S. PATENT DOCUMENTS

| | | | |
|---|---|---|---|
| 5,952,110 A | * | 9/1999 | Schell ..................... F01D 11/12 427/427 |
| 6,701,615 B2 | | 3/2004 | Harding et al. |
| 7,327,857 B2 | | 2/2008 | Lloyd, Jr. et al. |
| 7,561,729 B2 | | 7/2009 | Willis |
| 8,807,955 B2 | | 8/2014 | Wrabel et al. |
| 9,217,852 B2 | | 12/2015 | Baleine |
| 10,527,524 B2 | | 1/2020 | Stoyanov et al. |
| 10,544,698 B2 | | 1/2020 | Stoyanov et al. |
| 10,914,690 B2 | | 2/2021 | Schneider et al. |
| 2007/0076845 A1 | * | 4/2007 | Subramanian ....... G01N 23/046 378/58 |
| 2013/0004328 A1 | * | 1/2013 | Wrabel .................. F01D 5/288 427/299 |

(Continued)

OTHER PUBLICATIONS

USPTO; Notice of Allowance dated Apr. 5, 2023 in U.S. Appl. No. 17/744,530.

(Continued)

*Primary Examiner* — Jas A Sanghera
(74) *Attorney, Agent, or Firm* — SNELL & WILMER L.L.P.

(57) ABSTRACT

A method can comprise: scanning a tip of an airfoil of a bladed rotor, the tip including a coating disposed thereon, the coating comprising a metal plating and a plurality of protrusions, each protrusion in the plurality of protrusions extending from the metal plating; comparing a coating parameter of the coating to a coating parameter threshold based on scanner data from the scanning; and determining whether the coating maintains sufficient coverage of the tip of the airfoil based on the comparing.

14 Claims, 8 Drawing Sheets

(56) References Cited

U.S. PATENT DOCUMENTS

| | | |
|---|---|---|
| 2015/0300920 A1* | 10/2015 | DeAscanis ............ G01M 15/14 356/614 |
| 2016/0059278 A1 | 3/2016 | Mantkowski et al. |
| 2017/0176342 A1 | 6/2017 | Colletti |
| 2018/0066527 A1 | 3/2018 | Kadau et al. |
| 2018/0207689 A1 | 7/2018 | Takeuchi et al. |
| 2019/0172191 A1 | 6/2019 | Finn et al. |
| 2021/0387746 A1 | 12/2021 | Danko |

OTHER PUBLICATIONS

USPTO; Restriction/Election Requirement dated Sep. 27, 2022 in U.S. Appl. No. 17/744,530.
USPTO; Non-Final Office Action dated Dec. 19, 2022 in U.S. Appl. No. 17/744,530.
European Patent Office; Search Report dated Sep. 25, 2023 in Application No. 23169584.2.
European Patent Office; Search Report dated Sep. 21, 2023 in Application No. 23169324.3.
European Patent Office; Search Report dated Sep. 25, 2023 in Application No. 23169609.7.
USPTO; Notice of Allowance dated Jan. 22, 2024 in U.S. Appl. No. 18/339,839.

\* cited by examiner

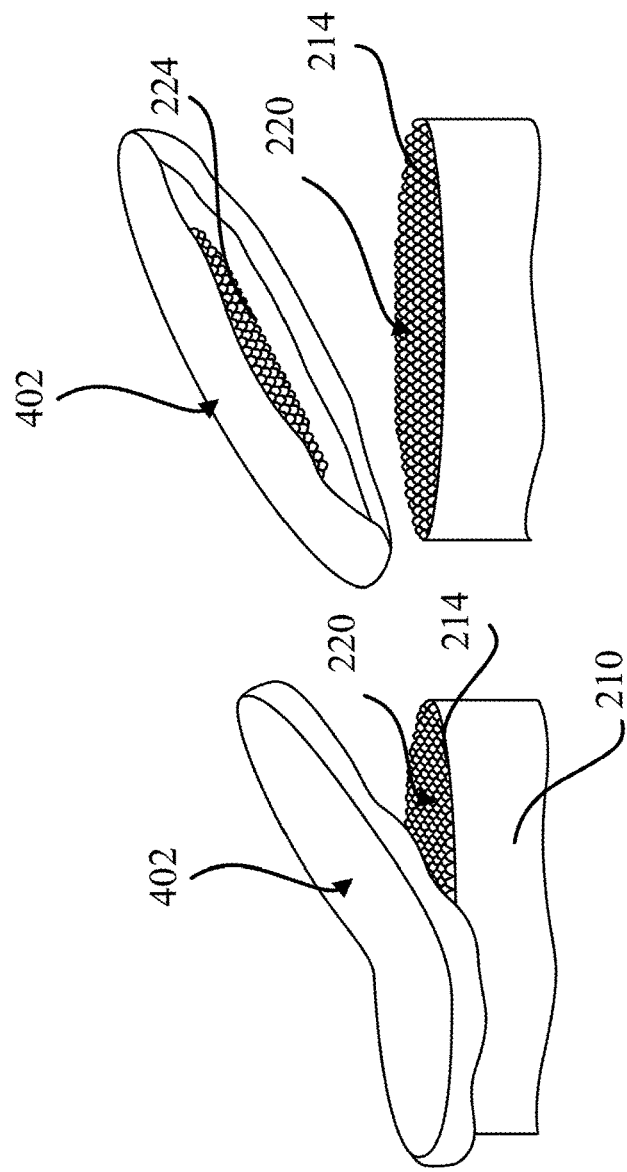
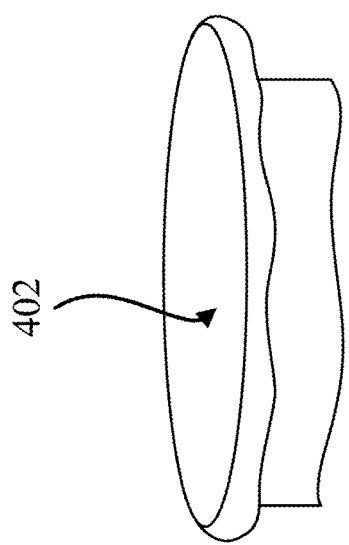
FIG. 4C
FIG. 4B
FIG. 4A

AIRFOIL TIP CLEANING AND ASSESSMENT SYSTEMS AND METHODS

FIELD

The present disclosure relates generally to cleaning and assessment systems and methods, and more particularly to, cleaning and assessment systems and methods for a tip of an airfoil of a bladed rotor.

BACKGROUND

Gas turbine engines (such as those used in electrical power generation or used in modern aircraft) typically include a compressor, a combustor section, and a turbine. The compressor and the turbine typically include a series of alternating rotors and stators. A rotor generally comprises a rotor disk and a plurality of airfoils. The rotor may be an integrally bladed rotor ("IBR") or a mechanically bladed rotor.

The rotor disk and airfoils in the IBR are one piece (i.e., monolithic, or nearly monolithic) with the airfoils spaced around the circumference of the rotor disk. Conventional IBRs may be formed using a variety of technical methods including integral casting, machining from a solid billet, or by welding or bonding the airfoils to the rotor disk.

Tips of airfoils for IBRs are often coated with a coating having an abrasive material, such a as cubic boron nitride ("cBN") coating or the like. The abrasive material is configured to interface with an abradable material disposed radially adjacent to the airfoil tip and coupled to a case, or any other surrounding support structure in the gas turbine engine. Initially, the abrasive material of the coating cuts into the abradable material, forming a trench, a recess, or the like. The coating is configured to protect the tips of airfoils of the IBRs when they interact with the abradable material.

At various maintenance intervals, or overhaul, for the gas turbine engine, each tip of an airfoil having the coating disposed thereon is inspected. Inspections are typically performed visually (i.e., in person or with pictures), which can be time consuming due to the number of airfoils in a compressor section of an aircraft and provide inconsistent success criteria for determining whether a tip of an airfoil is acceptable for entry back into service.

SUMMARY

A method is disclosed herein. The method can comprise: scanning a tip of an airfoil of a bladed rotor, the tip including a coating disposed thereon, the coating comprising a metal plating and a plurality of protrusions, each protrusion in the plurality of protrusions extending from the metal plating; comparing a coating parameter of the coating to a coating parameter threshold based on scanner data from the scanning; and determining whether the coating maintains sufficient coverage of the tip of the airfoil based on the comparing.

In various embodiments, the coating parameter includes a protrusion density. In various embodiments, the determining further comprises determining the coating does has insufficient coverage in response to the protrusion density being less than the coating parameter threshold in a local area of the coating. In various embodiments, the protrusion density corresponds to a number of protrusions per unit area on the tip of the airfoil.

In various embodiments, the method further comprises replacing the coating in response to determining the coating does not maintain sufficient coverage.

In various embodiments, the coating parameter comprises a surface roughness.

In various embodiments, the scanning is performed with a micro computed tomography scanner.

A method is disclosed herein. The method can comprise: receiving, via a processor, scanner data for a tip of each airfoil of a bladed rotor, the tip including a coating disposed thereon, the coating comprising a metal plating and a plurality of protrusions; comparing, via the processor, a coating parameter of the coating to a coating parameter threshold for the tip of each airfoil of the bladed rotor; and determining, via the processor, whether the coating parameter of any airfoil of the bladed rotor does not meet the coating parameter threshold.

In various embodiments, the method further comprises generating, via the processor, an indication that a first coating of a first airfoil should be replaced in response to determining the coating does not meet the coating parameter threshold for the first airfoil.

In various embodiments, the coating parameter includes a protrusion density. The protrusion density can correspond to a number of protrusions per unit area on the tip of the airfoil.

In various embodiments, the method further comprises replacing the coating in response to determining the coating does not maintain sufficient coverage.

In various embodiments, the method further comprises receiving, via the processor, an identifier for each airfoil of the bladed rotor. The method can further comprise generating, via the processor, an indication that a first coating of a first airfoil should be replaced based on the identifier and the determining.

In various embodiments, the method further comprises generating an indication that all coatings maintain sufficient coverage in response to determining the coating parameter for the tip of each airfoil meets the coating parameter threshold.

A coating assessment system is disclosed herein. The coating assessment system can comprise: a scanner; a display; and a tangible, non-transitory computer-readable storage medium having instructions stored thereon that, in response to execution by a processor, cause the processor to perform operations comprising: receiving, via the processor and through the scanner, scanner data from the scanner for a tip of each airfoil of a bladed rotor, the tip including a coating disposed thereon, the coating comprising a metal plating and a plurality of protrusions; comparing, via the processor, a coating parameter of the coating to a coating parameter threshold for the tip of each airfoil of the bladed rotor; determining, via the processor, whether the coating parameter of any airfoil of the bladed rotor does not meet the coating parameter threshold; and generating, via the processor and through the display, an indication that a first coating of a first airfoil should be replaced in response to not meeting the coating parameter threshold.

In various embodiments, the coating parameter includes a protrusion density. The protrusion density can correspond to a number of protrusions per unit area on the tip of the airfoil.

In various embodiments, the coating parameter comprises a surface roughness.

In various embodiments, the scanner comprises a micro computed tomography scanner.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIG. 4A illustrates a tip of an airfoil of a bladed rotor during a cleaning process;

FIG. 4B illustrates a tip of an airfoil of a bladed rotor during a cleaning process;

FIG. 4C illustrates a tip of an airfoil of a bladed rotor during a cleaning process;

DETAILED DESCRIPTION

The following detailed description of various embodiments herein refers to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Figure 1A:
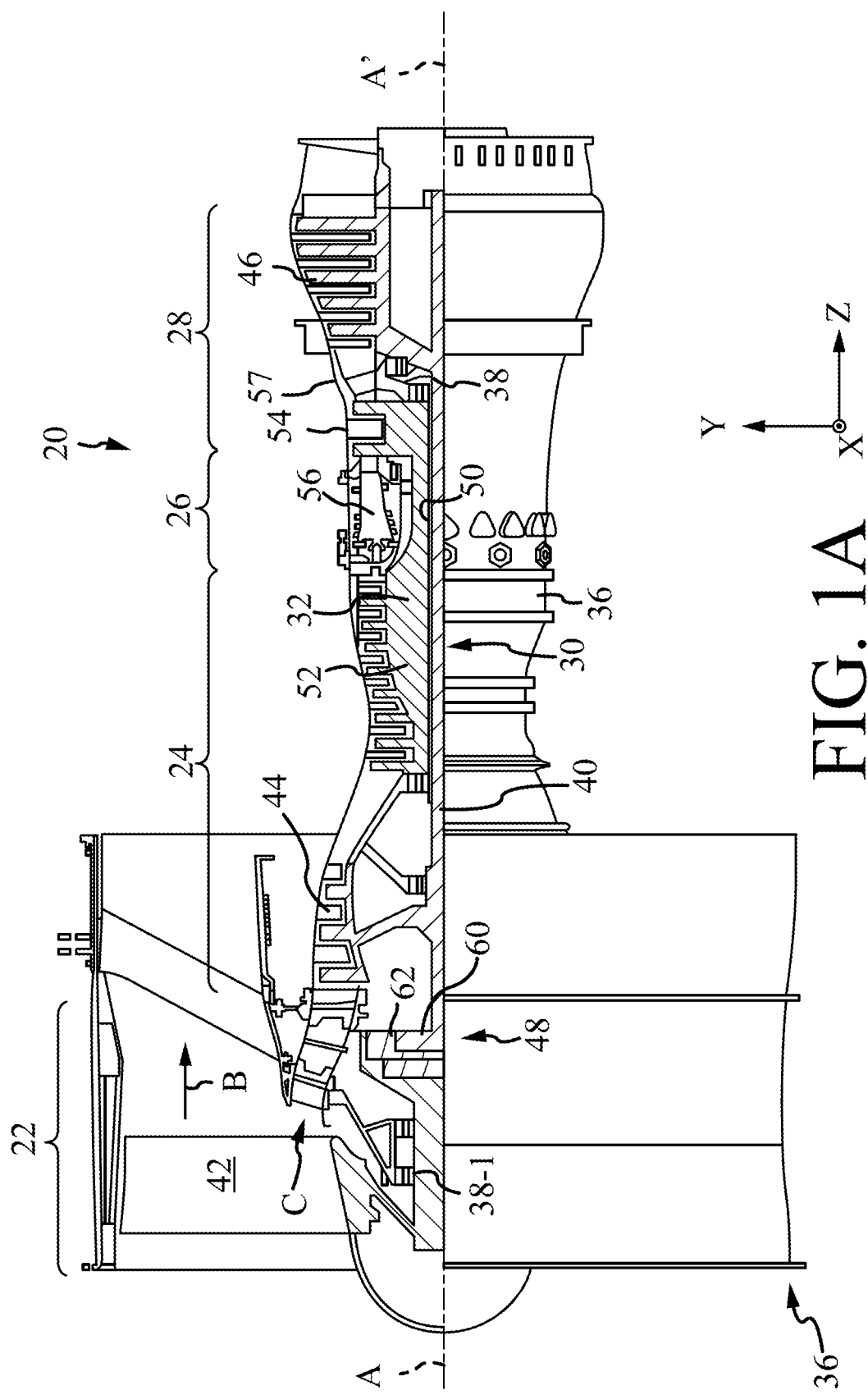
FIG. 1A illustrates a cross-sectional view of a gas-turbine engine, in accordance with various embodiments.

With reference to FIG. 1A, a gas turbine engine 20 is shown according to various embodiments. Gas turbine engine 20 may be a two-spool turbofan that generally incorporates a fan section 22, a compressor section 24, a combustor section 26, and a turbine section 28. In operation, fan section 22 can drive air along a path of bypass airflow B while compressor section 24 can drive air along a core flow path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures, single spool architecture or the like.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, etc. Engine central longitudinal axis A-A' is oriented in the Z direction on the provided X-Y-Z axes. It should be understood that various bearing systems 38 at various locations may alternatively or additionally be provided, including for example, bearing system 38, bearing system 38-1, etc.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Figure 1B:
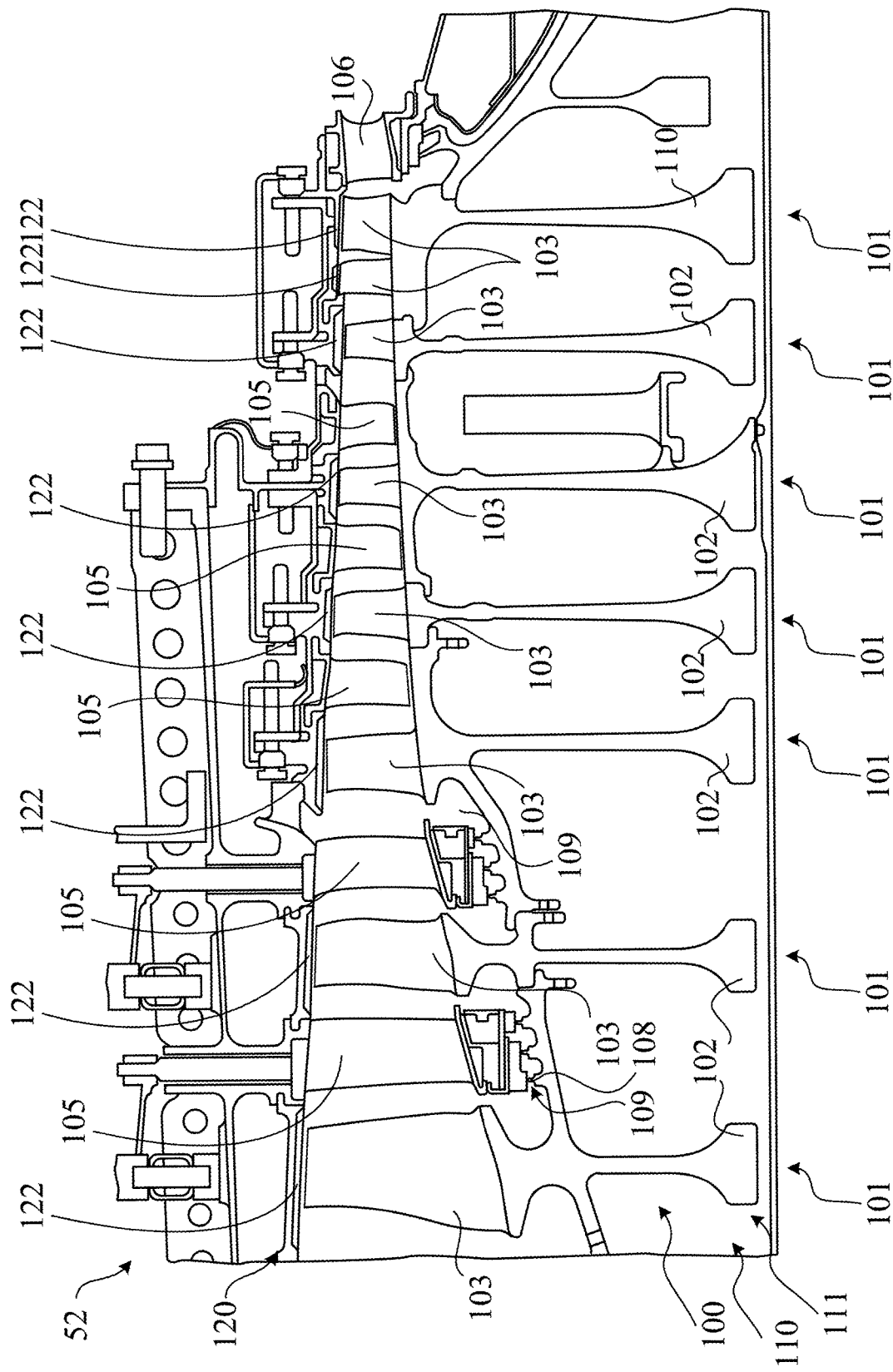
FIG. 1B illustrates a cross-sectional view of a high pressure compressor, in accordance with various embodiments.

In various embodiments, and with reference to FIG. 1B, high pressure compressor 52 of the compressor section 24 of gas turbine engine 20 is provided. The high pressure compressor 52 includes a plurality of blade stages 101 (i.e., rotor stages) and a plurality of vane stages 105 (i.e., stator stages). The blade stages 101 may each include a bladed rotor 100. In various embodiments, the bladed rotor 100 is an integrally bladed rotor, such that the airfoils 103 (e.g., blades) and rotor disks 102 are formed from a single integral component (i.e., a monolithic component formed of a single piece). However, the present disclosure is not limited in this regard. For example, the bladed rotor 100 can comprise a mechanically bladed rotor (i.e., each airfoil 103 mechanically coupled to the rotor disk 102). The airfoils 103 extend radially outward from the rotor disk 102. The gas turbine engine 20 may further include an exit guide vane stage 106 that defines the aft end of the high pressure compressor 52. Although illustrated with respect to high pressure compressor 52, the present disclosure is not limited in this regard. For example, the low pressure compressor 44 may include a plurality of blade stages 101 and vane stages 105, each blade stage in the plurality of blade stages 101 including the bladed rotor 100 and still be within the scope of this disclosure. In various embodiments, the plurality of blade stages 101 forms a stack of bladed rotors 110, which define, at least partially, a rotor module 111 of the high pressure compressor 52 of the gas turbine engine 20.

An outer engine case 120 is disposed radially outward from a tip of each airfoil 103. The outer engine case 120 comprises an abradable material 122 disposed radially adjacent to the tip of each airfoil 103. In this regard, the tip of each airfoil 103 comprises a coating, as described further herein, that includes an abrasive material. The abrasive material is configured to interface with the abradable material 122 of the outer engine case during operation of the gas turbine engine 20. Initially, the abrasive material of the coating cuts into the abradable material, forming a trench, a recess, or the like. The coating is configured protect the tips of airfoils 103 for the bladed rotors 100 from burning up during operation of the gas turbine engine 20.

Referring now to FIG. 2, a perspective view of a bladed rotor 200 is illustrated in accordance with various embodiments. The bladed rotor 200 can be in accordance with any of the bladed rotors 100 from FIG. 1A. The present disclosure is not limited in this regard. The bladed rotor 200 comprises a hub 202, a rotor disk 204 defining a platform 205, and a plurality of airfoils 206. Each airfoil in the plurality of airfoils 206 extends radially outward from the platform 205. For example, an airfoil 210 in the plurality of airfoils 206 extends radially outward from a root 212 of the airfoil 210 to a tip 214 of the airfoil. The root 212 can be integral with the platform 205 or coupled to the platform 205 as described previously herein. The present disclosure is not limited in this regard.

Figure 2A:
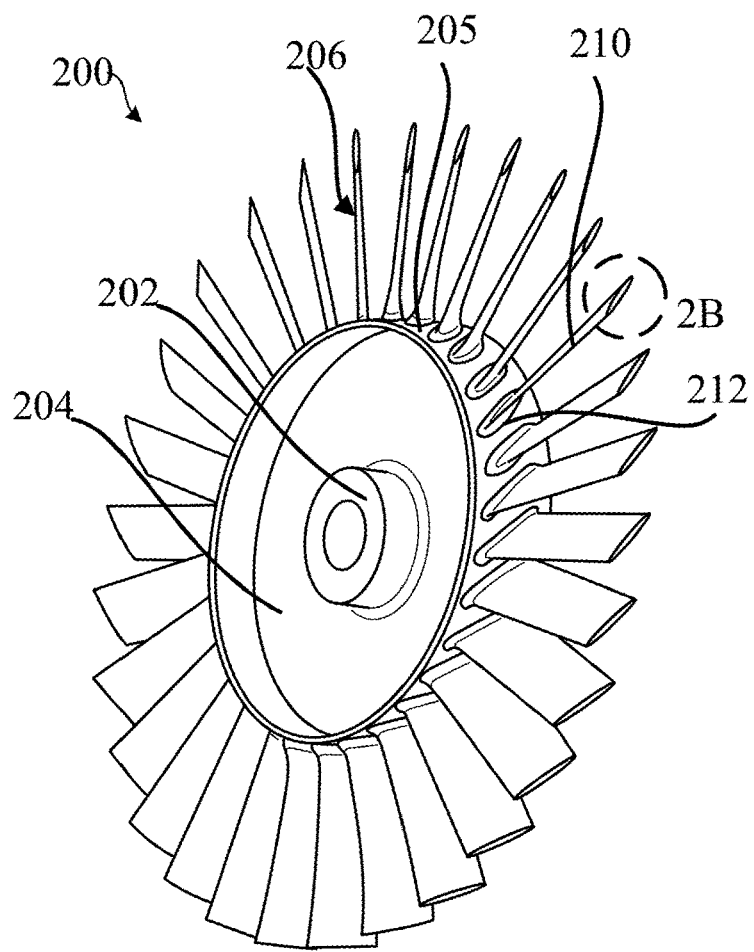
FIG. 2A illustrates a perspective view of a bladed rotor, in accordance with various embodiments.
Figure 2B:
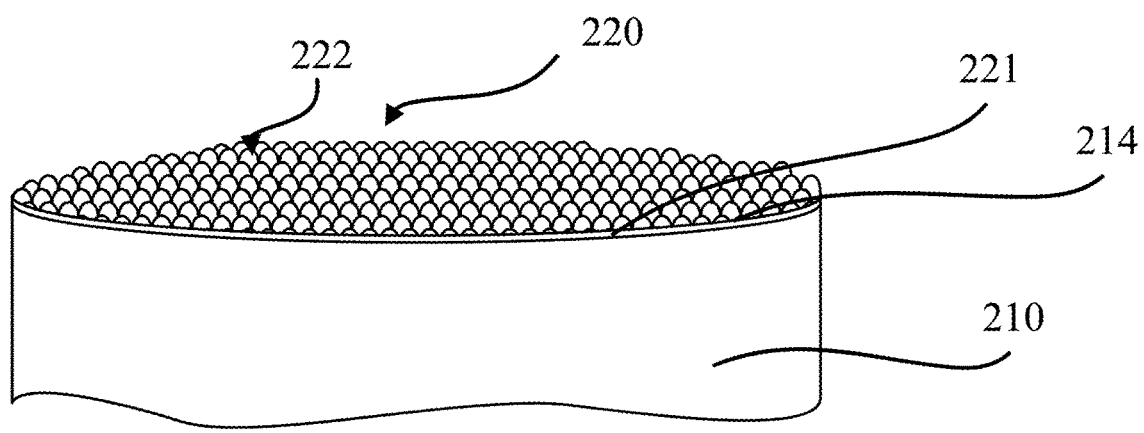
FIG. 2B illustrates a side view of a portion of an airfoil of a bladed rotor, in accordance with various embodiments.

Referring now to FIG. 2B, a detail view of portion of the airfoil 210 from FIG. 2A is illustrated, in accordance with various embodiments. Each airfoil in the plurality of airfoils 206 from FIG. 2A is in accordance with the airfoil 210. The airfoil 210 comprises a coating 220 disposed on the tip 214 of the airfoil 210. In various embodiments, the coating 220 comprises a metal plating 221 (e.g., a nickel plating or the like), and an abrasive material (e.g., alumina, cubic boron nitride, silicon carbide, tungsten carbide, silicon nitride, or titanium diboride) extending outward from the metal plating 221. For example, the coating 220 includes a plurality of protrusions 222 (i.e., grits). Each protrusion in the plurality of protrusions 222 extends radially outward from the tip 214 of the airfoil 210 (e.g., towards the abradable material 122 from FIG. 1B when installed). In various embodiments, each protrusion in the plurality of protrusions 222 of the coating 220 comprises cubic boron nitride.

Figure 3:
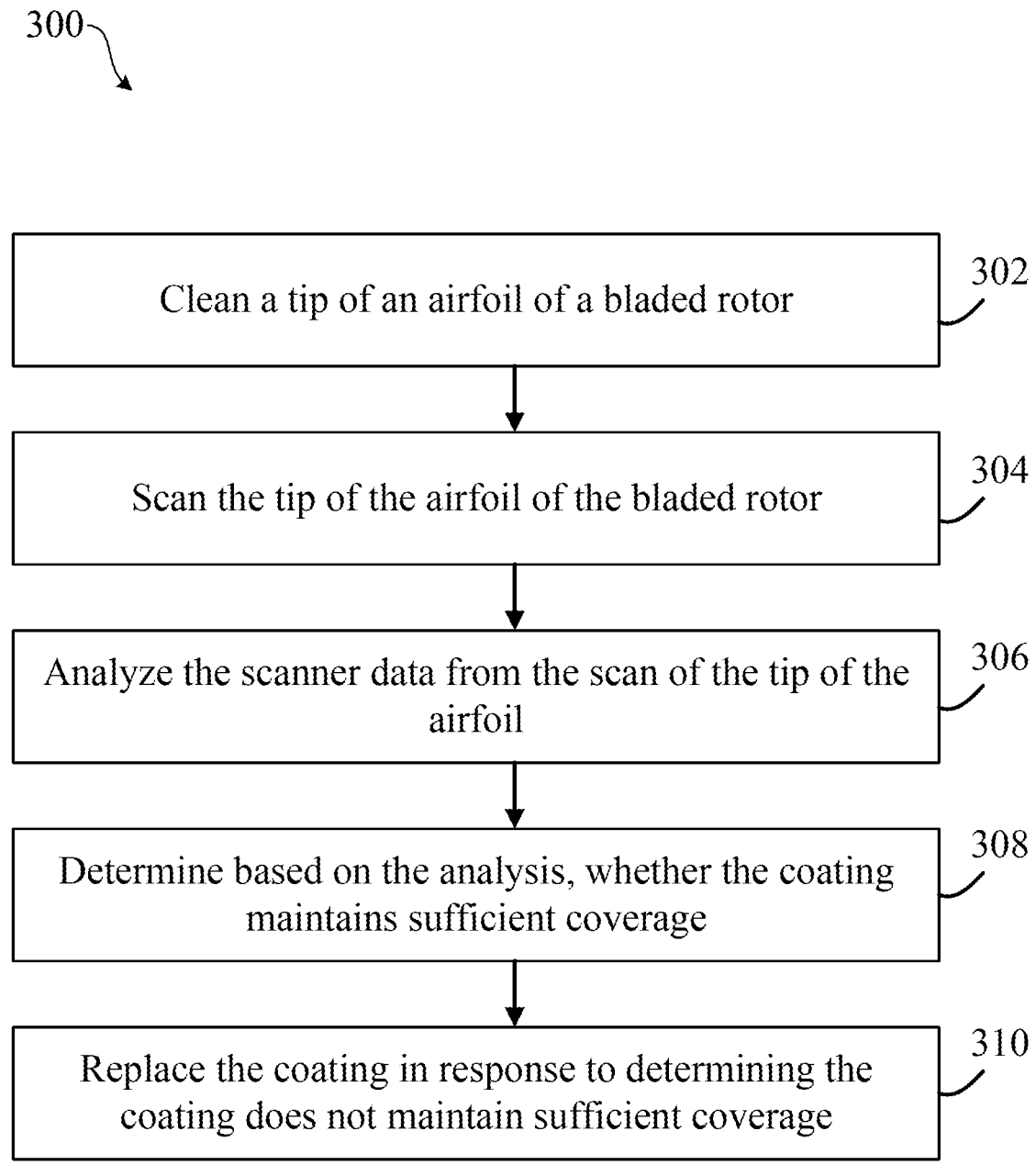
FIG. 3 illustrates a method of inspecting and assessing a tip of an airfoil for a bladed rotor.

Referring now to FIG. 3, a method 300 for assessing a tip of an airfoil for a bladed rotor (e.g., bladed rotor 200) is illustrated, in accordance with various embodiments. The method 300 comprises cleaning a tip 214 of airfoil 210 of a bladed rotor 200 (step 302). Although method 300 is described with respect to a single tip of a single airfoil, the present disclosure is not limited in this regard. For example, steps of method 300 may be performed for the tip of each airfoil of a bladed rotor 200 prior to moving on to a next step, in accordance with various embodiments. For example, the method 300 can include cleaning the tip 214 for each airfoil 210 of the bladed rotor 200. In this regard, all airfoils 210 of a bladed rotor may be cleaned prior to proceeding in method 300, then scanned in step 304, then analyzed in step 306, and so on. Thus, an inspection and analysis time for determining whether the tip 214 of each airfoil 210 in the plurality of airfoils 206 of the bladed rotor 200 may be greatly reduced relative to typical inspection and analysis systems and methods.

In various embodiments, cleaning the tip 214 of the airfoil 210 of bladed rotor 200 may include disposing a potting component. A "potting component," as described herein may be a thermoplastic elastomer, silicone, silicone rubber, natural rubber, epoxy, or the like. With brief reference to FIGS. 4A-C, a potting component 402 may be flowed over, in a liquid state, the tip 214 of an airfoil 210 to cover the entirety of the tip 214 (FIG. 4A). Once the potting component 402 hardens, the potting component 402 may be removed off of the tip 214 of the airfoil 210 as shown in FIGS. 4B and 4C. In this regard, loose particles 224 from the tip 214 of the airfoil 210 may be removed from the airfoil 210. In various embodiments, the loose particles include abradable material 122 as described previously herein. In various embodiments, the loose particles 224 comprise protrusions from the plurality of protrusions 222, which were loosened during operation.

Figure 5:
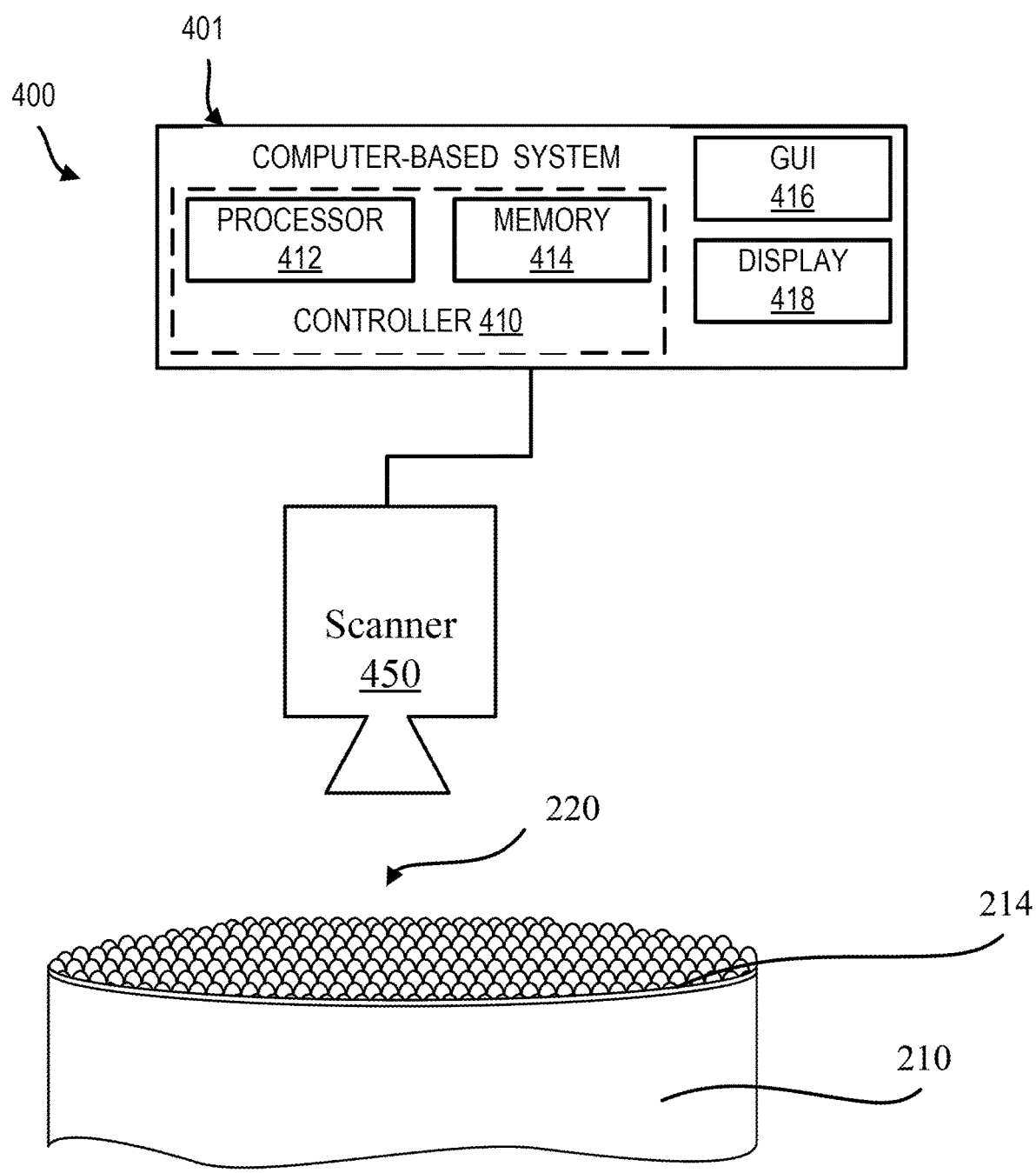
FIG. 5 illustrates an airfoil tip assessment system in use, in accordance with various embodiments.

Referring back to FIG. 3, the method 300 further comprises scanning the tip 214 of the airfoil 210 (step 304). With reference now to FIG. 5, an airfoil tip assessment system 400 for performing step 304 of method 300 is illustrated, in accordance with various embodiments. The airfoil tip assessment system 400 includes a scanner 450 and a computer-based system 401 including a controller 410, a graphical user interface (GUI) 416, and a display 418. In various embodiments, the computer-based system 401 may further be coupled to, and configured to control, a motor coupled to a shaft that mounts to a bladed rotor 200 from FIG. 2A. In this regard, the scanner 450 may be configured to scan a tip of each airfoil of a bladed rotor 200 from FIG. 2A. Thus, an airfoil tip inspection time may be greatly reduced for a bladed rotor 200, in accordance with various embodiments.

In various embodiments, the computer-based system 401 comprises a controller 410. In various embodiments the GUI 416, display 418, and the scanner 450 are in electronic communication (e.g., wireless or wired) with the scanner 450. In various embodiments, controller 410 may be integrated into computer system. In various embodiments, controller 410 may be configured as a central network element or hub to access various systems and components of the airfoil tip assessment system 400. Controller 410 may comprise a network, computer-based system, and/or software components configured to provide an access point to various systems and components of the inspection system. In various embodiments, controller 410 may comprise a processor 412. In various embodiments, controller 410 may be implemented in a single processor. In various embodiments, controller 410 may be implemented as and may include one or more processors and/or one or more tangible, non-transitory memories (e.g., memory 414) and be capable of implementing logic (e.g., memory 414). Each processor can be a general purpose processor, a digital signal processor (DSP), an application specific integrated circuit (ASIC), a field programable gate array (FPGA) or other programable logic device, discrete gate or transistor logic, discrete hardware components, or any combination thereof. Controller 410 may comprise a processor 412 configured to implement various logical operations in response to execution of instructions, for example, instructions stored on a non-transitory, tangible, computer-readable medium (e.g., memory 414) configured to communicate with controller 410.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, the scanner 450 comprises an optical scanner (e.g., structured light scanners, such as white light scanners, structured blue light scanners, or the like), a mechanical scanner, a laser scanner, a non-structured optical scanner, a non-visual scanner (e.g., computed tomography), or the like. In various embodiments, the scanner 450 comprises a micro computed topography (micro-CT) scanner. In this regard, the scanner 450 provides scanner data illustrating elemental particle distribution. Thus, a user can distinguish between nickel alloys, titanium alloys, cubic boron nitride of a coating, etc. Thus, based on scanner data from the scanner 450, a coating 220 of a tip 214 of an airfoil 210 can be assessed in a more accurate and precise manner as described further herein.

Referring back to FIG. 3, the method 300 further comprises analyzing the scanner data (step 306). In various embodiments, analyzing in step 306 can be performed by the processor 412 from airfoil tip assessment system 400. Although described herein as being performed by the processor 412, the present disclosure is not limited in this regard, and one skilled in the art may readily recognize that a user can interpret and analyze the scanner data, in accordance with various embodiments.

Figure 6:
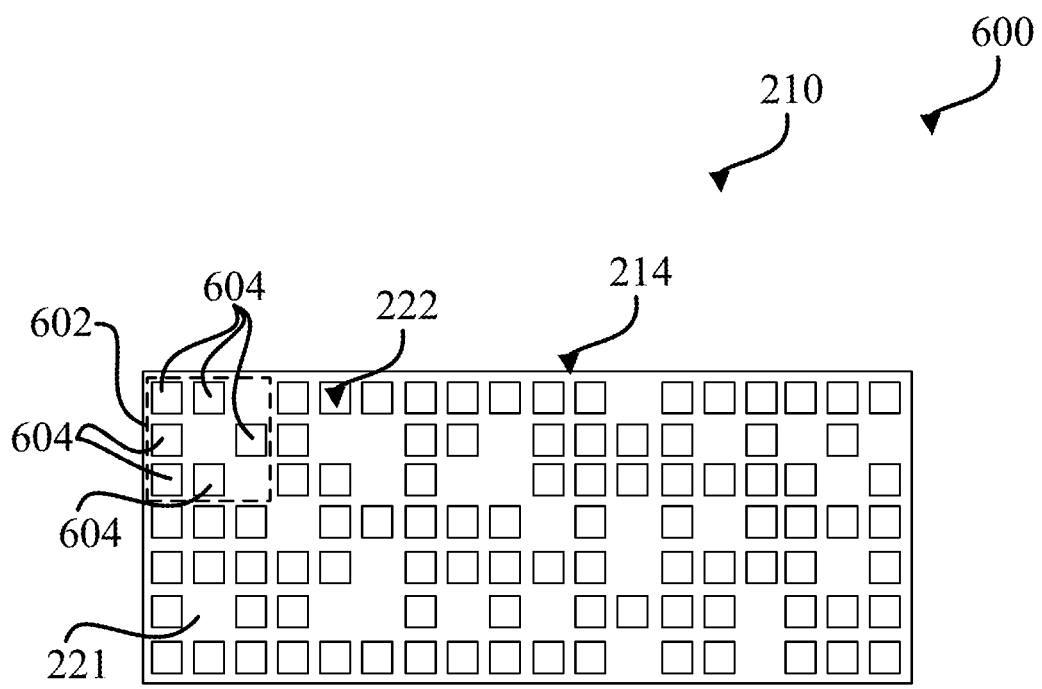
FIG. 6 illustrates an image from a scanner of the airfoil tip assessment system, in accordance with various embodiments.

In various embodiments, step 306 further comprises comparing a coating parameter to a coating parameter threshold. For example, the coating parameter can include a surface roughness, a protrusion density, or the like. In various embodiments, the coating parameter is a protrusion density. For example, referring now to FIG. 6, an image 600 based on scanner data from the scanner 450, with like numerals depicting like elements, is illustrated, in accordance with various embodiments. Based on the scanner data, each and every local area of the tip 214 of the airfoil may be analyzed to determine if the local area has a protrusion density above a protrusion density threshold. For example, a local area 602 can be analyzed by comparing a number of remaining protrusions 604 to a threshold number of protrusions (i.e., an acceptable number of protrusions). In various embodiments, the local area 602 comprises seven protrusions, where the local area 602 typically has nine protrusions when originally manufactured. Although the typical newly manufactured local area 602 includes nine protrusions, a protrusion threshold (i.e., to achieve acceptable abradable characteristics of coating 220), six protrusions may be acceptable. In this regard, a protrusion threshold for the local area 602 may be six protrusions or greater. In this regard, acceptable criteria for a coating 220 being inspected at various maintenance intervals or overhaul may be significantly more consistent, precise, and reliable, and/or may be performed more efficiently relative to typical assessments for a tip of an airfoil 210, in accordance with various embodiments.

Referring back to FIG. 3, the method 300 further comprises determining, based on the analysis of step 306, whether the coating maintains sufficient coverage (step 308). In this regard, an entire tip 214 of an airfoil 210 may be analyzed in accordance with the method described in FIG. 7, and if any local area is determined to have a protrusion density less than a protrusion density threshold, then the controller 410 of the airfoil tip assessment system 400 displays the coating 220 at the tip 214 of the airfoil 210 as having to be replaced.

The method 300 further comprises replacing the coating 220 with a new coating in response to determining the coating 220 does not maintain sufficient coverage (step 310). Replacing coating 220 may be a time intensive process, in accordance with various embodiments. In this regard, by accurately and consistently assessing a coating 220 of an airfoil, unnecessary replacement of coating 220 may be eliminated, greatly decreasing an overhaul or maintenance interval for a bladed rotor 200, in accordance with various embodiments.

Figure 7:
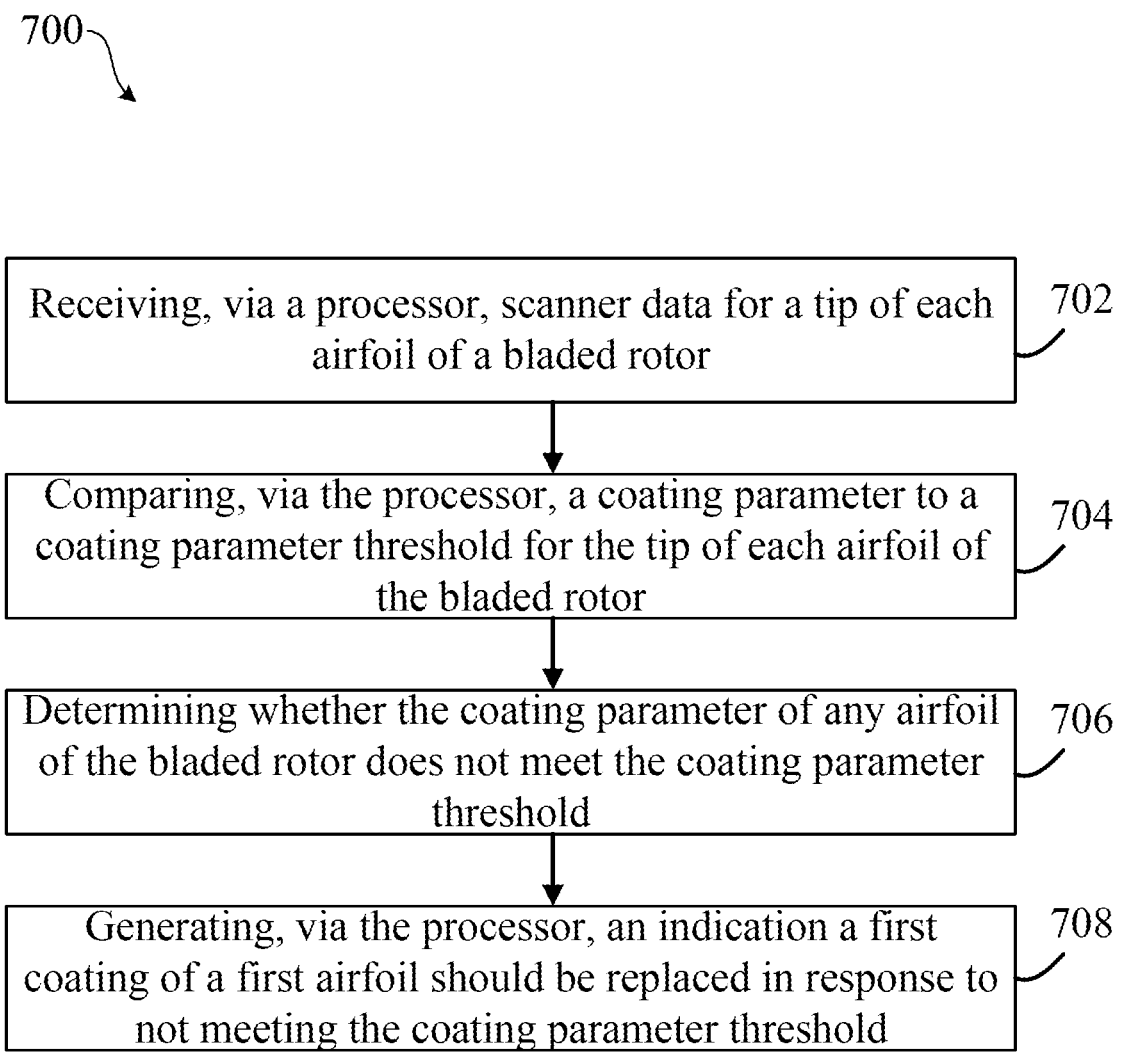
FIG. 7 illustrates an assessment process performed by the airfoil tip assessment system, in accordance with various embodiments.

Referring now to FIG. 7, an assessment process 700 performed by the airfoil tip assessment system 400 from FIG. 5, is illustrated, in accordance with various embodiments. The assessment process 700 comprises receiving, via the processor 412, scanner data from the scanner 450 for a tip 214 of each airfoil 210 in a plurality of airfoils 206 of a bladed rotor 200 (step 702).

The process 700 further comprises comparing, via the processor 412, a coating parameter (e.g., surface roughness, protrusion density, etc.) to a coating parameter threshold for the tip 214 of each airfoil 210 in the plurality of airfoils 206 of the bladed rotor 200 (step 704).

The process 700 further comprises determining, via the processor, whether the coating parameter of any airfoil of the bladed rotor does not meet the coating parameter threshold (step 706). In response to not meeting the coating parameter threshold, the processor 412 generates an indication that a first coating of a first airfoil should be replaced (step 708). In this regard, each airfoil can be tagged with an identifier (e.g., a radio frequency identification tag, a barcode, or the like) and scanned prior to scanning a respective tip, so any coatings that are to be replaced can be located easily.

In various embodiments, the process 700 is more efficient and less time consuming relative to visual inspections typically employed for assessing coverage of a coating on a tip of an airfoil.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method, comprising:
    scanning a tip of an airfoil of a bladed rotor, the tip including a coating disposed thereon, the coating comprising a metal plating and a plurality of protrusions, each protrusion in the plurality of protrusions extending from the metal plating;
    analyzing a plurality of local areas of the tip of the airfoil;
    comparing a coating parameter of the coating for each of the plurality of local areas to a coating parameter threshold based on scanner data from the scanning, the coating parameter including one of a protrusion density and a surface roughness; and
    determining whether the coating maintains sufficient coverage of the tip of the airfoil based on the comparing.

2. The method of claim 1, wherein the determining further comprises determining the coating does has insufficient coverage in response to the protrusion density being less than the coating parameter threshold in at least one of the plurality of local areas of the coating.

3. The method of claim 1, wherein the protrusion density corresponds to a number of protrusions per unit area on the tip of the airfoil.

4. The method of claim 1, further comprising replacing the coating in response to determining the coating does not maintain sufficient coverage.

5. The method of claim 1, wherein the scanning is performed with a micro computed tomography scanner.

6. A method, comprising:
    receiving, by one or more processors, scanner data for a tip of each airfoil of a bladed rotor, the tip including a coating disposed thereon, the coating comprising a metal plating and a plurality of protrusions;
    receiving, by the one or more processors, an identifier for each airfoil of the bladed rotor;
    analyzing, by the one or more processors, a plurality of local areas of the tip of the airfoil;
    comparing, by the one or more processors, a coating parameter of the coating for each of the plurality of local areas to a coating parameter threshold, the coating parameter including one of a protrusion density and a surface roughness;
    determining, by the one or more processors, whether the coating parameter of any airfoil of the bladed rotor does not meet the coating parameter threshold; and
    responsive to determining that the coating parameter of a first airfoil of the bladed rotor does not meet the coating parameter threshold, generating, by the one or more processors, an indication that the coating of the first airfoil should be replaced, the indication including the identifier of the first airfoil.

7. The method of claim 6, further comprising generating, by the one or more processors, an indication that a first coating of a first airfoil should be replaced in response to determining the coating does not meet the coating parameter threshold for the first airfoil.

8. The method of claim 6, wherein the coating parameter includes a protrusion density.

9. The method of claim 8, wherein the protrusion density corresponds to a number of protrusions per unit area on the tip of the airfoil.

10. The method of claim 6, further comprising replacing the coating in response to determining the coating does not maintain sufficient coverage.

11. The method of claim 6, further comprising generating an indication that all coatings maintain sufficient coverage in response to determining the coating parameter for the tip of each airfoil meets the coating parameter threshold.

12. A coating assessment system, comprising:
    a scanner;
    a display; and
    a tangible, non-transitory computer-readable storage medium having instructions stored thereon that, in response to execution by one or more processors, cause the one or more processors to perform operations comprising:
        receiving, by the one or more processors and through the scanner, scanner data from the scanner for a tip of each airfoil of a bladed rotor, the tip including a coating disposed thereon, the coating comprising a metal plating and a plurality of protrusions;

analyzing, by the one or more processors, a plurality of local areas of the tip of the airfoil;

comparing, by the one or more processors, a coating parameter of the coating for each of the plurality of local areas to a coating parameter threshold, the coating parameter including one of a protrusion density and a surface roughness;

determining, by the one or more processors, whether the coating parameter of any airfoil of the bladed rotor does not meet the coating parameter threshold; and generating, by the one or more processors and through the display, an indication that a first coating of a first airfoil should be replaced in response to not meeting the coating parameter threshold.

13. The coating assessment system of claim 12, wherein the protrusion density corresponds to a number of protrusions per unit area on the tip of the airfoil.

14. The coating assessment system of claim 12, wherein the scanner comprises a micro computed tomography scanner.

* * * * *